A. G. Coes,

Wrench.

No. 3350.

Reissued Mar. 30. 1869.

Witnesses,
Thos. H. Dodge
H. L. Fuller

Inventor,
A. G. Coes

N. PETERS, PHOTO-LITHOGRAPHER, WASHINGTON, D. C.

UNITED STATES PATENT OFFICE.

AURY G. COES, OF WORCESTER, MASSACHUSETTS.

IMPROVEMENT IN WRENCHES.

Specification forming part of Letters Patent No. 52,968, dated March 6, 1866; Reissue No. 3,350, dated March 30, 1869.

*To all whom it may concern:*

Be it known that I, A. G. COES, of the city and county of Worcester, and State of Massachusetts, have made an invention of certain new and useful Improvements in Wrenches; and I do hereby declare the following to be a full, clear, and exact description thereof, due reference being had to the accompanying drawings, making part of this specification, and in which—

Figure 1:
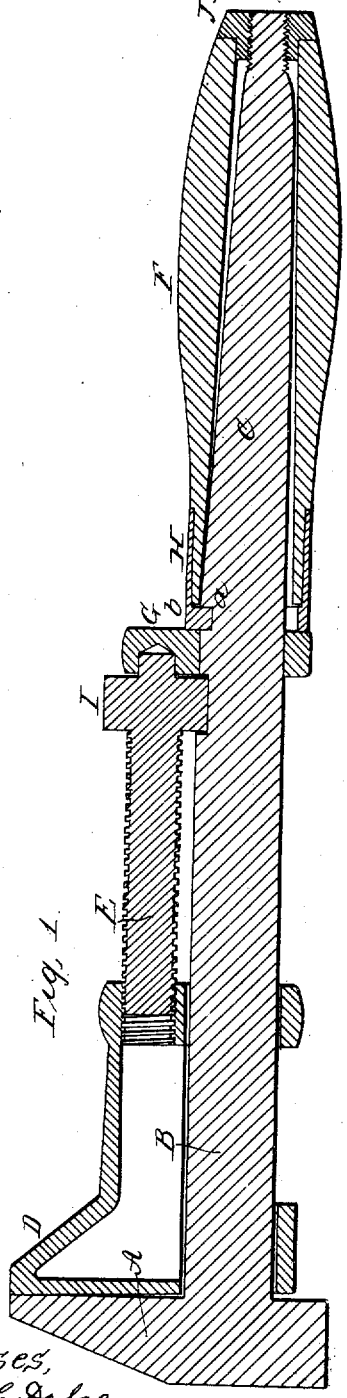
Figure 2:
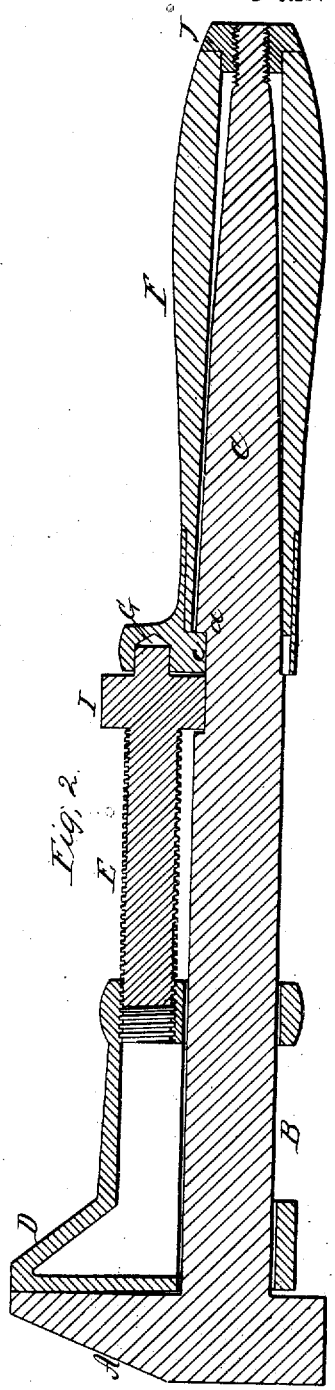

Figures 1 and 2 are longitudinal sections of a wrench constructed in accordance with my invention.

The invention comprising the subject of these Letters Patent is an improvement in "screw-wrenches," so called, and of that class known as the "Coes" wrench, and in which the movable jaw slides upon the bar of the stationary jaw, and is provided with a screw passing through it and stepped in a collar or abutment fixed to the shank of the stationary jaw-bar, such collar being held in place merely by the tenure of the handle upon such shank.

Heretofore in the construction of the above-mentioned class of wrenches much difficulty has been experienced in attempting to provide a safe and reliable means of sustaining the screw of the movable jaw or its step in proper position against the pressure brought upon it. Under the peculiar construction of parts embodied in the Coes wrench, before alluded to, this pressure upon the movable jaw and its screw and stop drives such stop or its supporting-abutment back against the handle, and either crushes or fractures the latter or forces it from its hold upon the shank of the stationary jaw-bar, thus impairing the effectiveness of the implement and not unfrequently rendering it worthless.

My present improvement relates to means for confining, in a simple manner, the movable jaw of a wrench, through the medium of its screw and the step of the latter, to the bar of the stationary jaw and in connection with the handle of the implement, whereby great means of strength are obtained to resist the pressure or strain exerted upon the movable jaw, as well as to prevent loosening or misplacement of any of the parts.

The invention consists, first, in forming a solid and unyielding metallic connection between the step of the movable jaw-screw or the support of such step and the stationary jaw-bar by means of a notch and lip, whereby any tendency of such screw or its support to either oblique or longitudinal misplacement is effectually guarded against; and, secondly, the invention relates to the form of the lip, in relation to its supporting sleeve, and in combination with the handle of the implement, whereby the latter, or an equivalent substitute therefor, prevents lateral movement of the lip, thus forming a barrier against longitudinal movement of the screw, while the handle in its turn insures the proper position of the lip within its notch or socket.

In the drawings accompanying this specification, and which illustrate my invention, A represents the stationary jaw, B the bar of such jaw, and C the shank thereof; D, the movable jaw E; the screw by which the movable jaw is operated, and F the handle of one of the well-known Coes wrenches before mentioned as being the one upon which my present invention is an improvement.

In carrying out my present invention, I step the inner extremity of the screw E or of the milled head or "rosette" formed thereupon in a block, G, encompassing and fitting tightly to the shank C of the stationary jaw B, such union preventing any oblique movements between the two.

To secure the block firmly in place upon the shank and enable it to withstand the pressure brought upon it by the screw without misplacement of itself or injury to any of the contiguous parts of the implement, I cut in one side of the said shank—preferably the upper one, as shown in the accompanying drawings, and immediately in rear of the block—a notch or groove, *a*, and I mount upon the shank, and abutting closely against the block, a ferrule or sleeve, H. This ferrule, as shown in perspective in Fig. 3 of the accompanying drawings, is formed at its outer end with an inwardly-projecting annular lip, *b*, the opening C of such lip being eccentric with respect to the end of the ferrule, in order that when the latter is finally fixed in position about the shank *c* and concentric, or thereabout, with such shank, the longer portion of such lip shall extend tightly into the groove or notch *a* of the shank, the notch thus serving as an unyielding abutment to prevent slipping of the ferrule and the block G upon the shank.

The handle of the wrench, as shown at F in the drawings, is composed preferably of wood, and has a hole, *d*, bored axially through it to receive and tightly inclose the shank of the jaw-bar which extends through it, the outer end of the said shank being provided with a nut to screw tightly against the end of the handle to hold it securely in proper position, it being understood, and will be seen by referring to the accompanying drawings, that the inner end of the handle F is inserted within the ferrule H after the latter has been fixed in position upon the shank *c*, thereby wedging and securing the ferrule H concentrically upon the shank *c*, thus serving to prevent lateral slipping of the ferrule upon the shank and insuring the fixture of the former in the notch of the latter.

I have shown in Fig. 2 of the accompanying drawings a modification of my invention. In this instance the step or block G and the ferrule H are in one homogeneous piece of metal, the lip *b*, as before described, being dispensed with and the block taking its place. In this case the area of the notch is enlarged and the entire width of the block extends into it.

It is obvious that various modifications may be made in the carrying out of my present improvement without affecting its characteristic feature, which, as before observed, consists in providing a metallic joint or connection between the support of the screw of the movable jaw and the bar or shank of the stationary jaw of a wrench, minor conditions of the invention being the insuring of the proper union of such posts by means of the handle or its equivalent substitute.

I claim as my invention, and desire to secure by Letters Patent of the United States, and as an improvement upon Coes' wrench before alluded to, as follows:

1. As a means of sustaining the support or step of the foot of the movable jaw-screw in position the metal joint or connection, composed of the notch *a* and the ferrule H, with its eccentric lip or its equivalent, in manner and for the purpose substantially as before explained.

2. The formation and application of the ferrule H in such manner that it shall serve the twofold purpose of an abutment to prevent longitudinal movement of the movable jaw-screw or its step or support in one direction and as a protection against fracture or injury to the handle.

3. The combination and arrangement of the ferrule H, with the shank *c* and the handle F, whereby such handle or its equivalent serves the purpose of preventing escape of the lip of such ferrule from the groove or notch in the shank, as described.

AURY G. COES.

Witnesses:
FRED. CURTIS,
EDWARD GRIFFITH.